United States Patent [19]
Stigsson

[11] Patent Number: 5,507,141
[45] Date of Patent: Apr. 16, 1996

[54] PROCESS FOR RECOVERING ENERGY FROM A COMBUSTIBLE GAS

[75] Inventor: Lars Stigsson, Hammarö, Sweden

[73] Assignee: Kvaerner Pulping Technologies AB, Kalstad, Sweden

[21] Appl. No.: 343,555

[22] PCT Filed: May 29, 1992

[86] PCT No.: PCT/SE92/00363

§ 371 Date: Nov. 29, 1994

§ 102(e) Date: Nov. 29, 1994

[87] PCT Pub. No.: WO93/24703

PCT Pub. Date: Dec. 9, 1993

[51] Int. Cl.⁶ .................................. F02C 3/28; F02C 3/30
[52] U.S. Cl. ..................... 60/39.05; 60/39.12; 162/30.11
[58] Field of Search ................................ 60/39.05, 39.12, 60/39.511, 39.53, 39.59, 736; 162/30.1, 30.11

[56] References Cited

U.S. PATENT DOCUMENTS 4,682,985  7/1987  Kohl ..................................... 48/197 R
4,733,528  3/1988  Pinto ..................................... 60/39.12
4,753,068  6/1988  El-Masri .

FOREIGN PATENT DOCUMENTS 9115665  10/1991  WIPO .

Primary Examiner—Louis J. Casaregola
Attorney, Agent, or Firm—George T. Marcou; Marks & Murase

[57] ABSTRACT

A process for recovering energy from a combustible gas generated by partial oxidation of cellulose waste liquor in a gas generator (A) operating in a temperature range of 600°–1300° C. and a pressure in the range of 1–100 bar, cooling and cleaning said combustible gas and using the gas as fuel in a recuperated gas turbine cycle (C, E), wherein water and/or steam is injected to humidify compressed air and/or combustible gas, increasing turbine motive fluid massflow and power output.

22 Claims, 2 Drawing Sheets

PROCESS FOR RECOVERING ENERGY FROM A COMBUSTIBLE GAS

FIELD OF THE INVENTION

The present invention relates to an improved process for recovering energy from a combustible gas generated during gasification of cellulose waste liquors, the improvement comprising a cooling zone, wherein the combustible gas is cooled to a temperature below 150° C., simultaneously recovering sensible and latent heat in one or more heat exchangers, discharging the cooled combustible gas for use as fuel in a water and/or steam injected recuperative gas turbine cycle.

BACKGROUND OF THE INVENTION

The kraft process is currently the dominant chemical pulping process. During pulping large quantities of recoverable energy in the form of black liquor is generated. Worldwide some 2.8 billion GJ (780 TWh) of black liquor was produced in 1990 at kraft pulp mills.

The kraft recovery system has two principal functions:

i) Recovery and recure of the inorganic pulping chemicals.

ii) Recovery of the energy value of the organic material as process steam and electrical power.

The chemical recovery process contributes significantly to the capital intensity of the kraft process. About 35% of the capital cost of a modern pulp mill is attributable to the recovery process.

The predominant method today for recovery of chemicals and energy from black liquor is the Tomlinson recovery boiler, a technology which was introduced well over fifty years ago. Although an established technology, there are some wellknown disadvantages with conventional recovery technology.

Most often the recovery boiler with its inherent in flexibility constitutes the main production bottleneck in the pulp mill. Economics of scale dictate large capacity units.

Other disadvantages include the low thermal efficiency and risk of smelt water explosions which in turn con stitute a safety problem.

These and other areas of concern have been the driving force for development of new methods and principles for recovering chemicals and energy from black liquor. One of the more promising routes is gasification of the liquor in entrained or fluidized beds. In some cases these alternative processes can be installed as incremental capacity boosters, providing an opportunity to eliminate the recovery boiler bottleneck.

One of the major driving forces for development of new recovery technology has been to improve thermal efficiency accompanied with higher power to steam output ratios. The present invention relates to a major improvement in this area, using technology based on gasification and energy recovery in a recuperated gas turbine cycle.

Gasification of black liquor can be performed at various temperatures and pressures, resulting in different forms of the recovered inorganic constituents and different calorific values of the combustible process gas.

The inorganics, mainly sodium compounds, are solubilized to form an aqueous alkaline liquid called green liquor, which liquor is used for cooking liquor preparation.

Kraft pulp mills are significant producers of biomass energy and today most mills are designed to use the biomass fuel available at the kraft mill to meet on site steam and electricity needs via back pressure steam turbine cogeneration system. Electricity demand is often higher than internally generated, in particular for integrated mills and often electricity is imported from the grit.

Process steam requirements for a modern kraft pulp mill is in the order of 10 GJ per ton of air dried pulp. The internal electricity demand is around 600 kWh/ton of air dried pulp.

The biomass gasification gas turbine cogeneration system of the present invention will meet mill steam demand and has the potential to produce excess electricity for export.

The present invention can be practised using various types of gas generators and gasification principles exemplified in prior art documents.

In U.S. Pat. No. 4,917,763 and U.S. Pat. No. 4,692,209, gasification of spent cellulose liquor, such as black liquor, is described. The gasification temperature is in the range of 1000°–1300° C., resulting in the evolvement of molten inorganics and a combustible gas. The molten alkaline chemicals are withdrawn from the gas stream in a cooling and quenching stage where an aqueous solution is sprayed into the gas steam. The product alkaline solution is cooled to below 200° C.

The combustible gas is used for generating steam or as a synthesis gas.

Another gasification method is described in U.S. Pat. No. 4,808,264 where recovery and energy from black liquor is carried out in three distinct and separate steps, whereas in the first step concentrated black liquor is gasified in a pressurized gasification reactor by flash pyrolysis at 700° to 1300° C., in which the inorganic chemicals of the black liquor are contained in the form of molten suspended droplets.

Energy is recovered from the resulting process gas for generation of steam and/or electric power in a gas turbine/ steam turbine cycle. The steam turbine is of back pressure type preferably selected to fit the needs of process steam for the mill.

In WO 91/15665 is described a method and apparatus for generation of electricity and steam from a pressurized black liquor gasification process. Energy is recovered in a gas turbine/back pressure steam turbine system. Excess steam generated in the mill is recirculated into the gas turbine or the combustor thereof for increasing the generation of electricity. This procedure is known to the industry as a steam injected gas turbine hereinafter referred to as STIG.

Common for U.S. Pat. No. 4,808,264 and WO 91/15665 is that they both are based on energy recovery using a combined cycle including a back pressure steam turbine.

These systems have a rather high thermal efficiency but suffer from the high capital cost of the steam turbine and waste heat steam generator. The electricity output from a condensing steam turbine in a combined cycle is often less than a third of the total power output and considerably less for back pressure turbines.

A bottoming steam cycle as in these inventions has an inherent high thermodynamic irreversiblity since the evaporation of water occurs at constant temperature, whereas the heat release occurs at varying temperatures, leading to lower thermal efficiencies.

The objective of the present invention is to provide a process for more efficient and less capital intensive production of electric power and process steam from gasification of black liquor using a recuperated gas turbine cycle following a gas quench cooler and heat exchange system where the hot process gas from the gasifier reaction zone is cooled to a temperature below 150° C., simultaneously recovering sensible and latent heat transferred for generation of steam for mill internal use.

A substantial quantity of sensible heat can also be extracted from hot liquids such as quench liquids, condensates and coolants, discharged from or within the quench zone and/or heat exchange zones.

Recovery of latent and sensible heat can be performed in various types of equipment including heat exchange steam generators, boiler feed water heaters and heat pumps.

In a specific embodiment, latent and/or sensible heat in the gas and/or liquid streams is recovered using a reversed absorption heat pump, where a heat absorbing medium such as for example sodium hydroxide solution is used for heat transfer.

The cooled combustible process gas is transferred to a gas turbine system in which some or all of the excess air, which is used as thermal diluent and working fluid, is replaced with water vapor.

Gas turbines are very sensitive to contaminants in the incoming gas stream, in particular sulfur oxides and alkali salts. To prevent harmful effects on turbo machinery, the gases have to be substantially free from these and other contaminants, in particular if the gas is used as fuel in an internally fired gas turbine cycle. It is therefore important to have efficient gas cleaning in the present invention in particular with respect to sodium, as sodium is a dominant inorganic compound in cellulose waste liquors.

It is appreciated that substantially all vaporized sodium compounds and particulates are removed in the quench gas cooler and scrubbing system of the present invention. Saturation vapour pressure of the harmful components in question is very low at temperatures below 200° C.

If necessary the process gas can be filtered or sodium compounds can be sorbed on an appropriate involatile inorganic sorbent, such as an alumino-silicate before the gas enters the gas turbine combustor. Zeolites may be used as filters or as sorbant surface for alkali removal.

One way to get around this problem totally is to use the process gas as fuel in an externally fired gas turbine cycle, which is another optional embodiment of the present invention, described subsequently herein.

Although gas turbine cycles have inherent thermodynamic advantages, simple cycle gas turbine systems suffer from some well known disadvantages as well, such as the large parasitic load of cooling air on the system to decrease the turbine inlet temperature.

Furthermore, the exhaust from the gas turbine contains a large quantity of sensible heat and, if discharged to atmosphere, large quantities of potentially useful energy are wasted. However, this exhaust heat can be exploited in various ways, for example to produce steam in a heat recovery steam generator (HRSG), which can be used for process needs directly or in a cogeneration figuration, or to produce more power in a condensing steam turbine. In light of the strong scale economics of steam turbine cycles and other factors described herein, combined gas turbine and steam turbine cycles based on heavy duty industrial turbines are not the best candidates for applications in the relatively modest scales in conjunction with black liquor gasification.

Another method to exploit the heat content of turbine exhaust is to raise superheated steam which is recirculated and injected in the combustor of the combustion turbine, see e.g. U.S. Pat. No. 3,978,661. Steam injection in biomass gasifier gas turbine cogeneration systems for forest product industry applications is for example described in PU/CEES Working Paper No 113 by Dr Eric Larson, Princeton, February 1990.

Yet another method to exploit the turbine exhaust is to preheat the air leaving the compressor against engine exhaust in a recuperative heat exchanger and simultaneously use interstage cooling during air compression. Injection of water in a recuperative cycle can further improve efficiency.

The principle of water injected recuperative gas turbine cycles is previously described, for instance in U.S. Pat. No. 2,869,324 and U.S. Pat. No. 4,537,023, and in literature; Gasparovic N., "Gas turbines with heat exchanger and water injection in the compressed air", Proc. Instn. Mech. Engrs., vol. 185, 1971.

A major drawback of direct fired gas turbine cycles as exemplified in prior art documents above is the high sensitivity to fuel gas quality.

Indirectly fired or externally fired gas turbine cycles are considerably less sensitive and can accept fuels of approximately the same quality as steam generators.

Indirect cycles, currently under development for coal gasification applications, can accommodate a wide variety of conventional equipment. Advanced combustors and high temperature heat exchangers are commercially available or under development.

Stack gas recirculation to use all the cycle air for combustion can be attractive in indirect cycles, minimizing $NO_x$ emissions and lowering capital cost.

As will be subsequently explained herein, use of an indirectly fired gas turbine cycle in combination with compressed air humidification by water injection is an attractive alternative embodiment of the present invention.

The practise of the present invention will be described by reference to the appended description, examples and figures as applied to the recovery from black liquor. It should, however, be recognized that the invention is applicable to the recovery of other cellulose waste liquors, such as for example spent sulfite or soda pulping liquors.

BRIEF DESCRIPTION OF THE DRAWINGS

The invention will be explained by referring to the appended figures, in which.

GENERAL DESCRIPTION OF THE INVENTION

In the subject process a cellulose waste liquor containing hydrocarbonaceous material and inorganic sodium compounds is reacted with an oxygen containing gas in a free flow gas generator A to produce a combustible gas. The gas generator operates at a reaction zone temperature of between 700°–1500° C. and at a pressure of 1–100 bar.

Figure 1:
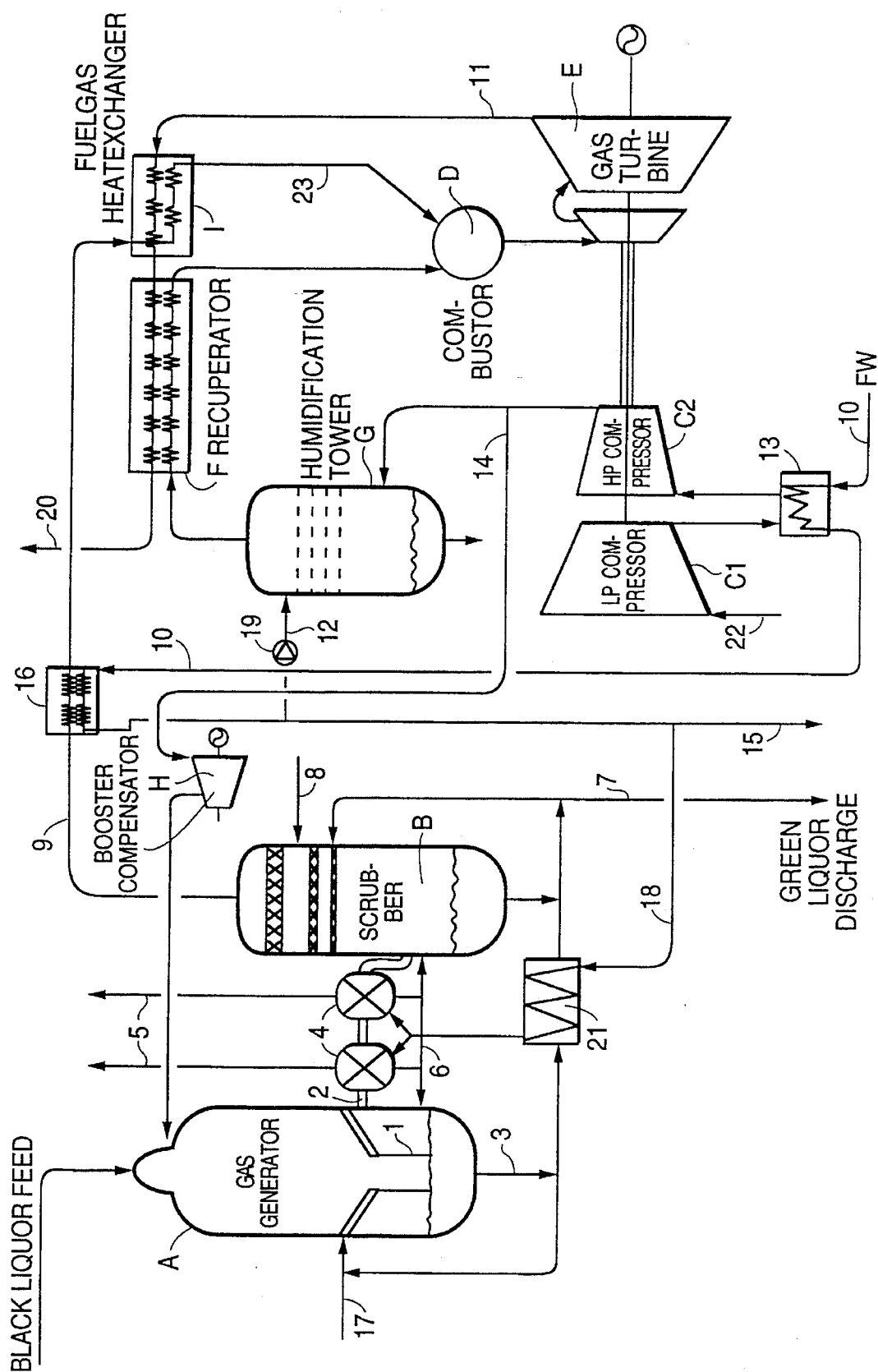
FIG. 1 discloses a preferred embodiment of an arrangement according to the invention, and FIG. 2 discloses an arrangement for cogeneration of 12 bar steam according to the invention.
Figure 2:
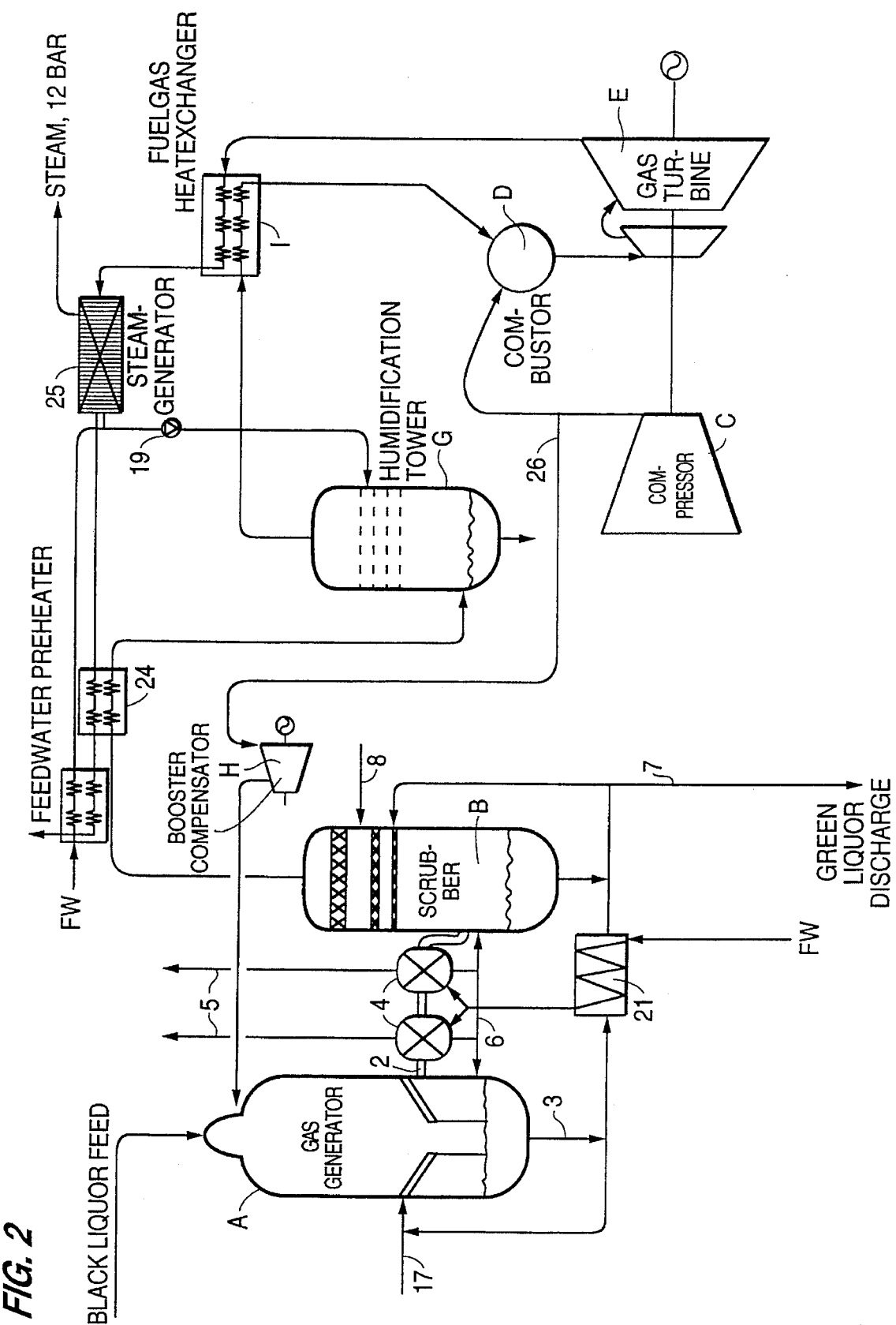

The hot effluent gas stream from the gas generator is rapidly cooled through direct contact with an aqueous liquid in a quench cooler 1, see FIG. 1. The main part of the cooling is a result of evaporation of part or all of the aqueous quench liquid. The temperature of the effluent gas 2 and quench liquid 3 is governed by the selected operating pressure of the gas generator and corresponds to the temperature of saturated steam at this pressure.

A large portion of the sensible heat in the hot effluent gas is thus absorbed and transferred to water vapor. The saturated gas leaves the quench system at a temperature in the range of 60°–220° C. and a pressure ranging from 1 to 100 bar, preferably at the same pressure as in the gas generator less pressure drop in the quench.

The combustible gas is then further cooled in one or more heat exchangers 4, simultaneously generating process steam 5 and/or hot water.

A large portion, if not all, of the mills' steam demand is thus covered by the cooling system heat exchange steam generators. A downstream gas turbine system E can hence be optimized for power generation.

The condensate 6 resulting from the cooling which may contain sodium compounds is withdrawn from the process gas and mixed with other aqueous liquids to form green liquor 7 for use in cooking liquor preparation.

The process gas leaving the heat exchangers is further cooled by scrubbing B with an aqueous liquid 8, which further enhances the removal of any carryover sodium fumes.

The resulting clean combustible gas 9 has a temperature of between 20° and 150° C. and a pressure substantially at the same pressure as in the gas generator. The gas is saturated, and water vapor partial pressure corresponds to the temperature and total pressure.

Further gas purification and sodium removal can optionally be performed by downstream filtering or electrostatic precipitation.

The heating value of the process gas is dependent on the type and amount of oxidant used in the gas generator. The use of air as oxidant results in that about half the product gas consists of nitrogen, thus resulting in a gas with a rather low calorific value.

According to overall energy balance and capital cost considerations there is little or nothing to be gained by using industrial oxygen as oxidant for gasification of black liquor in the present invention despite the higher product gas quality.

The clean product gas from air blown black liquor gasification has a heating value, in the range of 3.5–5 MJ/Nm$^3$.

After final cooling and scrubbing, the temperature of the process gas is raised by heat exchange with hot circulating green liquor and/or circulating compressor intercooling coolant 10 and/or gas turbine exhaust 11.

The preheated clean combustible gas is thereafter used as fuel in a gas turbine plant comprising a compressor C, combustor D and gas turbine E.

To attain the power generation objective of the present invention the mass flow through the turbine is increased by injecting water or steam into the gaseous streams entering the combustor or before expansion in the gas turbine and by preheating said gaseous streams by heat exchange with gas turbine exhaust.

A distinguishing feature of the present invention is the use of recuperators F which recycle a large portion of the turbine or combustor exhaust energy to preheat compressor discharge air and/or fuel gas prior to the combustor.

Furthermore, the use of compressor intercooling significantly improve the performance of recuperated cycles, since the compressor work is reduced and thermal energy lost by intercooling is counterbalanced by extraction of more heat from the exhaust gases in the recuperator.

In a preferred embodiment the compressed air stream is cooled after compression by adding water 12 to the air stream in a humidification tower G, in which all or part of the injected water evaporates. The dewpoint decides maximum water addition. In a following recuperator, the humid compressed air is heated by heat exchange with gas turbine exhaust.

Maximum heat is recovered from the exhaust gas when the temperature of the air at the inlet of the recuperator is equal to the dewpoint temperature. The evaporative regeneration is performed in one or more steps with humidification towers before the recuperators. An alternative embodiment is to arrange an evaporative aftercooler after the compressor discharge, followed by a water injected evaporative recuperator.

By injection of water in the compressed air stream in this way, at least two objectives are reached. The resulting increased massflow through the gas turbine increases power output and reduces the parasitic load of air compression.

Further, by injecting water into the compressed air, the lower temperature and higher heat capacity of the fluid give more favourable heat exchange conditions with respect to the turbine or combustor exhaust.

Yet another objective of the invention is reached by providing pressurized oxidant air for the operation of the gas generator. The reduced need for diluent cooling air in the gas turbine in the present invention enables provision for supply of all the air needed for gasification.

Another specific advantage of the process of the present invention is that it can utilize low level heat from the discharged flue gases 20, the compressor intercooler 13 or from the gasification process or utilize low level heat from elsewhere in the mill to preheat water used for evaporative cooling of the compressed air and/or fuel gas, and hence improve overall efficiency.

A major advantage of the present invention is its simplicity. The entire bottoming cycle of a combined cycle is eliminated, resulting in lower capital costs for a given electricity output. Recuperators and humidifiers does not present serious design or operational difficulties.

A disadvantage with water or steam injected cycles is that water added to the humidifier is lost if no method to recapture the vapor from the exhaust gas is used. For gas turbine systems with evaporative regeneration the water consumption for humidification is in the order of 0.1–0.8 kg water per kWh power and about twice as much for power efficient STIG systems. In both cases the water has to be processed to boiler feed water quality.

The gas turbine cycle in the present invention can be integrated with a facility for production of demineralized water to be used for injection. Such a demineralization plant could be based on various principles known from the sea water desalination industry.

Demineralization plants based on distillation processes are most preferred for use in the present invention since they can use heat from the exhaust stream directly or use surplus steam or low level heat from else where in the mill.

In another preferred embodiment of the present invention heat pumps are used for recovery of sensible and latent heat from the combustible gas stream and/or alkaline liquors discharged from the quench zone and/or heat exchange zone. The use of heat pumps is particularly attractive when gasification pressure is lower than say 10–15 bar, as useful steam in a pressure range of 2–10 bar can be generated despite lower saturation temperature in the gas streams and lower temperature in the liquid streams discharged from the quench zone.

When practising the present invention at lower gasification pressures, say lower than 10–15 bar, the use of a downstream indirect fired gas turbine cycle becomes more attractive relative to direct fired systems. The efficiency of indirect fired systems are substantially independent on fuel gas pressure.

In the indirectly fired cycle the fuel gas is fired in a combustor in the presence of gas turbine exhaust, and combustor exhaust heat is extracted for preheat of humidified compressed air, which air is used as motive fluid in the gas turbine. Use of high cast ceramics such as fused aluminia/silica compounds as heat exchange surface permits pre-heat of air in range of about 1000° C. and above. One obvious advantage of the indirect cycle is the lower sensitivity to fuel gas quality.

Water injection into the compressed air or the fuel gas as practised in several embodiments of the present invention lowers the adiabatic flame temperature in the combustor, however, as long as combustion is stable, this effect has negligible impact. Higher solids loading in the black liquor feed counteract this effect by increasing fuel gas heating value and adiabatic flame temperature.

Average water vapor partial pressure in the turbine exhaust gas stream in the present invention is in the order of 5–25 % of the total pressure.

It will also be appreciated that environmental benefits will result from the present invention as injection of water or steam in a gas turbine system gives a lower peak flame temperature in the combustor at given turbine inlet temperatures. $NO_x$ emissions tend to fall exponentially with increased heat capacity of the humid combustion air and/or fuel gas. Water vapor in smaller quantities also exert catalytic effects on the decomposition of hydrocarbons and minimizes carbon monoxide emissions.

EXAMPLES

Example I (FIG. I)

A kraft market pulp mill produces 1070 ton/day bleached pulp, generating a black liquor flow of 1662 ton/day as dry solids. The mill's internal steam requirements amount to 112 ton 5 bar steam and 36 ton 13 bar steam per hour. Electricity consumption in the mill is 600 kWh/ton pulp or 642 MWh/day (26.75 MW). Black liquor is fed to a suspension bed gasifier integrated with an evaporative recuperated gas turbine system for energy recovery.

The black liquor has the following data at the gasifier entrance:

| | |
|---|---|
| Dry solids | 78% |
| Temperature | 170° C. |
| Higher heating value | 14.8 MJ/kg DS |
| Flow rate | 19.24 kg DS/s |

The gasifier is operated at a pressure of 25 bar and a reaction zone temperature of 950° C.

Air is bled off from the gas turbine compressor (14) and used as oxidant in the gas generator. The temperature and pressure of the air leaving the gas turbine compressor are increased by a booster compressor.

The process gas leaving the gasifier is cooled by heat exchange in two indirect heat exchangers, generating 112 ton 5 bar steam per hour and 7 ton 2 bar steam per hour for export to the mill. The gas is further cooled by scrubbing in a countercurrent spray scrubber.

The clean process gas leaving the scrubber has a temperature of 40° C. and a pressure of 23 bar. The gas has the following composition:

| | |
|---|---|
| CO | 17.2% |
| $H_2$ | 18.7% |
| $CO_2$ | 11.0% |
| $H_2O$ | 0.3% |
| $N_2$ | balance |

The calorific value of the gas is 4.2 MJ/Nm³ (LHV).

The process gas is discharged from the gasifier/scrubber and used as fuel in a recuperative gas turbine plant.

After scrubbing, the process gas temperature is increased to 130° C. by heat exchange with hot water (10) from the compressor intercooler (13) and the gas is further preheated by gas turbine exhaust in a recuperative heat exchanger to 450° C. before entering the gas turbine combustor.

Boiler feed water (10) is preheated in the compressor intercooler from 30° C. to 145° C., and used for combustible gas preheat and partly as injection water in the humidifier and as boiler feed water. Excess water (15) is used as bark boiler feed water. A stream of boiler feed water (18) from the gas preheater (16) is preheated by indirect heat exchange (21) with green liquor from the gasifier/scrubber circulation loop from 125° C. to 160° C.

Another stream of boiler feed water is pumped (19) to the humidifier in line (12).

Make up water is added in line (17).

The gas turbine exhaust stream is finally discharged from the gas turbine plant and recuperators through line (20).

The gas turbine cycle has the following main design criteria:

| Efficiencies | |
|---|---|
| Compressor adiabatic efficiency | = 0.89 |
| Turbine adiabatic efficiency | = 0.91 |
| Generator efficiency | = 0.99 |
| Ambient air conditions at compressor inlet (22) | |
| Temperature | 15° C. |
| Pressure | 1.033 atm |
| Relative humidity | 60% |
| Fuel (23) | |
| Clean process gas from gasification of black liquor. | |
| Temperature | 450° C. |
| Calorific value | 4.2 MJ/Nm³ (LHV) |
| Air bleed from compressor to gasifier (14) | |
| Temperature | 290° C. (after booster compressor) |
| Flow | 26.6 Nm³/s |
| Gas turbine inlet conditions | |
| Pressure | 15 bar |
| Temperature | 1100° C. |
| Water for injection | |
| Temperature | 125° C. |
| Flow | 7 kg/s |

Miscellaneous

A minimum temperature difference of 20° C. between heating and heated fluids in the recuperators is assumed.

Combustion and mechanical efficiencies are assumed to be 1.0.

Auxiliary power is assumed to be negligible.

No provision is made for additional gas turbine cooling.

Power consumption in air booster compressor is 3.3 MW (efficiency 0.8).

| Result | |
| --- | --- |
| Net power output | 85.9 MW |
| Net power yield | 32% |
| Thermal efficiency | 65% |
| Temperature in flue gas after the recuperator | 200° C. |
| Exhaust gas flow | 163 Nm³/s |

Water vapor content in flue gas 10.8%

Oxygen content in turbine exhaust 10.9%

Example II (FIG. II)

Process gas generated in a black liquor gasifier is cooled by heat exchange and further cooled in a scrubber to a temperature of 40° C., recovering 86 ton 5 bar steam and 27 ton 2 bar steam per hour for use in the mill. Other relevant data as in example I.

The clean cooled process gas is preheated to 300° C. in a heat exchanger (24), whereafter the process gas is humidified in a countercurrent multistage saturator, decreasing the gas temperature to 131° C. The saturated process gas is thereafter preheated in a heat exchanger by extracting heat from the gas turbine exhaust. The temperature of the process gas entering the gas turbine combustor is 450° C.

Gas turbine exhaust heat is used for heat exchange with incoming fuel gas in two recuperative heat exchangers and for generation of 34 ton 12 bar steam per hour in a waste heat boiler. (25)

Compressor intercooling is not used in this cycle and the heat in compressor exhaust is transferred directly to the combustor.

A part of the hot air from the compressor is bled off and recirculated for use as gasifier oxidant. (26)

| Result | |
| --- | --- |
| Net power output | 76.6 MW |
| Net power yield | 28% |
| Thermal efficiency | 69% |
| Temperature in discharged flue gas | 210° C. |
| Water vapor in flue gas | 9.2% |
| Oxygen content in turbine exhaust | 11.8% |

Additonal Embodiments

The turbine exhaust flue gas leaving the recuperators still contain a considerable amount of heat, although at a low temperature. This heat can for instance be used for low pressure steam generation. Due to the comparatively high water content in the flue gas, also condensing heat recovery can be profitable.

In a condensing heat recovery system, the temperature of the flue gas is lowered to below the water vapor dewpoint, with condensation as a result. The heat recovered is both sensible and latent, the latter giving the greater contribution. The same or higher energy quantity can be recovered by flue gas condensing heat recovery in steam injected gas turbine cycles.

Another potential advantage of condensing flue gas heat recovery is that relatively pure water can be recovered for recirculation and use as injection water or steam.

The modern kraft mill often has hog and/or bark fired boilers or gasifiers integrated. Yet other mills have natural gas available for various purposes, such as lime kiln fuel.

The present invention can be practised in combination with combustion of other gaseous or liquid hydrocarbon fuels available at the mill. As an example, additional natural gas or biogas can be fired in a preburner in the compressed air stream or at the gas turbine combustor increasing gas turbine inlet temperature and power output.

The same objective can be reached by blending the combustible gas from the gasifier with another hydrocarbonaceous fuel.

Yet another method to increase power output in the present invention is to inject steam in various locations in the combustor or gas turbine.

The quench cooler following the gas generator could be replaced by liquid cyclones or by liquid injection cooling. In the appended claims such devices are grouped under the expression "contacting zone".

Obviously, various modifications of the invention as herein set forth may become apparent to those skilled in the art without departing from the spirit and scope thereof. Thus, for example a plurality of intercoolers may be used and reheaters may be employed with the gas turbine. Humidification may be employed in one or more steps with subsequent preheat, and water or steam may be injected at different locations in the cycle to increase motive fluid mass flow. Therefore, only such limitations should be made as are indicated in the appended claims.

What is claimed is:

1. A process for recovering energy from a combustible gas, generated by the partial oxidation of cellulose waste liquor in a gas generator operating in a temperature range of 600°–1500° C. and a pressure in the range of about 1–100 bar, cooling and cleaning said combustible gas by direct contact with an aqueous liquid in a first zone, thereby dissolving inorganic sodium components, forming an alkaline liquor, which liquor is withdrawn from the system for preparation of cooking liquor, discharging said combustible gas from said first zone and passing said combustible gas to fuel a gas turbine plant, thereby contacting at least part of said combustible gas with one of water and steam and burning said combustible gas in the presence of an oxygen containing gas, the improvement comprising the steps of:

(1) cooling the combustible gas stream leaving said first zone by passing said gas stream to at least one heat exchange zone, where the gas is cooled by heat exchange with at least one coolant to a temperature in the range of 30°–180° C.;

(2) compressing air to a predetermined pressure;

(3) bleeding compressed air from the compressed air stream for use as oxidant in the gas generator; and (4) extracting heat gas from gas turbine exhaust by indirect heat transfer to said combustible gas.

2. The process of claim 1, wherein the gas stream leaving said first zone, is cooled in at least one indirect heat exchanger transferring heat for generation of steam at a pressure of 1–15 bar.

3. The process of claim 2, wherein the gas stream after cooling by heat exchange is scrubbed and cooled with an aqueous liquid to a temperature below 150° C.

4. The process of claim 3, wherein at least one of condensates, alkaline liquids and scrubbing liquids are withdrawn from the gas stream, which condensates and liquids after mixing and recirculation to at least one of the first zone and the scrubber are withdrawn for preparation of cooking liquor.

5. The process of claim 1, wherein said first zone is a quench zone.

6. The process of claim 1, wherein said first zone is a contacting zone.

7. The process of claim 5, wherein heat is recovered by heat exchange with alkaline liquor leaving at least one of the quench and heat exchange zones.

8. The process of claim 7, wherein at least one of the heat in the gas stream leaving the quench zone, heat in the liquids leaving the quench zone, and heat in the liquids leaving the heat exchange zone, is recovered by heat transfer using a heat pump system.

9. The process of claim 1, wherein air is compressed in at least one stage to a pressure exceeding 2 bar.

10. The process of claim 9, wherein air is compressed in at least two stages with intermediate intercooling.

11. The process of claim 10, wherein said intercooling is obtained by injection of water in the compressed air.

12. The process of claim 10, wherein said intercooling is obtained by indirect heat exchange with a cooling liquid.

13. The process of claim 1, wherein 5–30% by volume of the compressed air is bled off for use as oxidant in the gas generator.

14. The process of claim 1, wherein saturated combustible gas leaving the heat exchange zone, is contacted with aqueous liquid in at least one contacting zone, thereby cooling the saturated gas to a temperature in the range of 70° C.–145° C., whereafter said combustible gas is preheated by heat exchange with gas turbine exhaust heat and combusted in the presence of compressed air.

15. The process of claim 1, wherein combustible gas leaving the heat exchange zone, is contacted with aqueous liquids in at least one contacting zone, thereby cooling the gas to a temperature below 100° C., preheating said gas to a temperature above 100° C., humidifying the gas by injection of water into the gas stream, preheating the humid combustible gas to a temperature above 150° C. by heat exchange with gas turbine exhaust and combusting said humid gas in the presence of compressed air.

16. The process of claim 15, wherein one of humidified and saturated combustible gas is preheated in countercurrent heat exchange with gas turbine exhaust to a temperature of at least 300° C.

17. The process of claim 15 wherein low level heat is recovered from gas turbine exhaust streams by condensing heat recovery.

18. The process of claim 1, wherein condensates from condensing heat recovery are recirculated and used as injection water.

19. The process of claim 1, further comprising the step of injecting steam into gaseous streams entering at least one of a gas turbine combustor and gas turbine expander.

20. The process of claim 8, wherein said heat pump system is a reversed absorption heat pump system.

21. The process of claim 9, wherein said air is compressed to a pressure in the range of 5–50 bar.

22. The process of claim 21, wherein said air is compressed to a pressure in the range of 10–30 bar.

* * * * *